Patented Feb. 19, 1946

2,395,257

UNITED STATES PATENT OFFICE 2,395,257

THERMOPLASTIC TAPE

Ara T. Dildilian, Suffield, Conn., assignor to Bigelow-Sanford Carpet Co., Inc., Thompsonville, Conn., a corporation of Massachusetts No Drawing. Application December 28, 1940, Serial No. 372,198

2 Claims. (Cl. 117—68.5)

This invention relates to the joining of abutting edges of rug and carpet fabrics and particularly to novel adhesives and tapes employed for the purpose, and to a method of using them.

In the manufacture of floor coverings it is common to secure together the abutting edges of portions of floor covering fabric. Thus imitation broadloom carpets are made from strips of pile fabric secured together at abutting edges. Ornamental effects may be obtained by cutting out a portion of one fabric and inserting, in place of the cut-out portion, a fabric of a different color or weave.

For so joining the abutting edges of pile fabrics, it has been customary heretofore to apply a tape by the use of a solvent plastic adhesive. It has been my experience that various disadvantages have attended the use of such prior adhesives. Thus the evaporation of the solvent to set the adhesive takes time, frequently two hours or more, and requires the use of an extensive floor space for drying purposes. Evaporating solvents are a fire hazard. Furthermore, an appreciable odor is noticeable for a considerable time after the seam has been made.

The object of the present invention is to provide novel adhesives and tapes for such use which not only obviate the disadvantages attending the use of prior adhesives and tapes, but which also give a better bond than heretofore. To that end I have provided a thermoplastic adhesive of certain novel characteristics to be noted hereinafter which secures the tape to the abutting rug edge portions with the desired tenacity. Although thermoplastice at higher temperatures, such as 400° F., the adhesive which I provide will not flow at temperatures encountered under normal service conditions which may be as high as 120° F. and the seam will not open even when the carpet has been installed under tension.

The tape so secured must itself resist tearing to provide, with the adhesive, a seam of maximum strength and my experiments have indicated that whereas a tape of a fairly close weave cotton duck material is suitable where exceptional strength is not necessary yet a tape of an open weave, such as a leno weave, is strongest. Bias cut tapes, particularly if of an open weave are very effective for the purpose.

The use of open weaves, however, presents a further problem in that, when applying a tape of such character with a thermoplastic adhesive, the adhesive is apt to seep through the comparatively large interstices of the tape, thereby coating the iron with adhesive which is, of course, undesirable.

Accordingly, when the tape employed for my purpose is of an open weave, as is preferable, I provide the tape with a material which bridges the interstices thereof, at least temporarily and while heat is being applied.

The adhesive which I employ is, as stated, thermoplastic and preferably consists of a copolymer vinyl resin composed of vinyl acetate and vinyl chloride, suitably plasticized. As a specific formula, the following materials in substantially the parts by weight indicated, may effectively be used:

| | Parts |
|---|---|
| Copolymer vinyl acetate and vinyl chloride, Vinylite VYNS | 10 |
| Tricresyl phosphate | 3 |

Although suitable solvents may be employed as a vehicle for compounding the ingredients, I have found that the use of heat is preferable. To that end, for compounding the above formula, the tricresyl phosphate is first heated to a temperature of about 220° F. after which the vinyl resin is added with agitation.

After cooling, the resultant compound can be worked with heated rolls and calendered onto the tape cloth in much the same way as smoked rubber.

I have found that the copolymer vinyl resin is particularly effective for my purpose because it not only secures the tape tenaciously to the backs of the abutting edges of floor coverings by the use of heat and without requiring solvent, but it also exhibits a very low degree of cold flow so that the seams do not open even when the floor covering has been laid under tension, as is conventional practice.

As a further formula which I have successfully employed, the following ingredients, in parts by weight, may be used:

| | Parts |
|---|---|
| Copolymer vinyl acetate and vinyl chloride, Vinylite VYNS | 73 |
| Di-2-ethylhexoate of triethylene glycol | 25 |
| Lead stearate | 2 |

The above ingredients are preferably cold mixed and then milled in a rubber mill, after which the mixture is calendered onto the tape cloth.

In the manufacture of floor covering fabrics that are to be cut and seamed together, it is customary to frayproof the fabric prior to cutting by the application of adhesive which coats and impregnates the backing. Where the floor covering, after cutting, is to be joined by the use of a tape carrying the thermoplastic adhesive above noted, I greatly prefer to employ, for frayproofing, an adhesive which is also a copolymer vinyl chloride and vinyl acetate or, less desirably, polyvinyl acetate. If, however, the floor covering has previously been frayproofed with a pyroxylin coating, as is sometimes encountered in practice, I prefer to employ, as the adhesive for the tape, polymerized vinyl acetate. A preferred formula is as follows:

| | Parts by weight |
|---|---|
| Polyvinyl acetate Vinylite AYAF | 1,000 |
| Dibutyl phthalate | 50 |
| Butyl recinoleate | 50 |

The tape which I employ is, as stated, preferably, although not necessarily, of an open leno weave type for maximum strength. To inhibit the flow of thermoplastic adhesive through the open meshes of the tape and onto the heat applying device used either to coat the type with adhesive or to apply the coated tape to the carpeting, I preferably bridge the interstices of the tape with a material which will not become plastic under the degree of heat employed to soften the adhesive, such as 400° F., or thereabouts. A lining material such as a highly glazed cloth of holland weave can be temporarily superimposed over the tape for the purpose but I prefer to coat the tape itself with a material which will close the tape interstices as I have found that method produces a tape in which the heat transfer from the iron through the bridging material to the thermoplastic is a maximum. The bridging material must be flexible and, if thermoplastic, must have a high softening point so that it is stable under temperatures such as that above noted, at which the thermoplastic adhesive becomes viscid. I have effectively employed nitrocellulose lacquers, Cellophane, cellulose acetate, or the like.

After the open weave tape has been treated with any of the foregoing bridging compounds it is coated with the thermoplastic adhesive which may be compounded as above. For this purpose the thermosplastic may be spread onto the tape while it is still in the molten state in which it was prepared but preferably the thermoplastic is allowed to cool after it has been prepared and is calendered either directly onto the tape or first into sheets and then onto the tape. This calendering is effected by passing the tape and thermoplastic film together over or between heated rolls.

My invention, the preferred embodiment of which has now been described, is not to be limited to any of the foregoing steps or specific ingredients except as indicated in the appended claims.

This application is a continuation-in-part of my application No. 140,697, filed May 4, 1937.

I claim:

1. As an article of manufacture a tape adapted to overlap and secure together the abutted edges of the backs of pieces of pile floor coverings and to be adhered thereto by the applied heat of a hot iron, said tape consisting of a strong woven fabric of open weave, the threads of the fabric being so spaced apart as to form interstices of substantial area and constituting an open mesh surface adapted to cooperate with the roughnesses on the back of a pile fabric to which the tape is applied to inhibit slipping of the tape on said back, a thin flexible dry film comprising a cellulosic compound non-viscid up to 400° F. united to the threads on one side of said tape and bridging the threads bounding said interstices to close said interstices at said side, and a thermoplastic adhesive coating selected from the group consisting of plasticized polyvinyl esters and plasticized vinyl copolymers, said adhesive being non-tacky and dry at normal room temperatures and tacky and soft at ironing temperatures up to 400° F., said coating being confined exclusively to the other side only of said tape and having the property of becoming stably united to said cellulosic compound and to the back of a pile floor covering when heated to ironing temperatures and allowed to cool.

2. An article of manufacture as specified in claim 1 in which the woven fabric is a leno fabric.

ARA T. DILDILIAN.